United States Patent
Nielsen et al.

(10) Patent No.: US 9,258,653 B2
(45) Date of Patent: Feb. 9, 2016

(54) METHOD AND SYSTEM FOR PARAMETER BASED ADAPTATION OF CLOCK SPEEDS TO LISTENING DEVICES AND AUDIO APPLICATIONS

(75) Inventors: Jakob Nielsen, Waterloo (CA); Robert Brennan, Kitchener (CA)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 516 days.

(21) Appl. No.: 13/425,972

(22) Filed: Mar. 21, 2012

(65) Prior Publication Data

US 2013/0253677 A1    Sep. 26, 2013

(51) Int. Cl.
*G06F 1/00* (2006.01)
*H04R 25/00* (2006.01)
*G06F 1/08* (2006.01)

(52) U.S. Cl.
CPC *H04R 25/00* (2013.01); *G06F 1/08* (2013.01); *H04R 2460/03* (2013.01)

(58) Field of Classification Search
CPC .......................................................... G06F 1/08
USPC ...................... 381/316, 66; 713/500; 704/233
See application file for complete search history.

(56) References Cited

U.S. PATENT DOCUMENTS

| | | | |
|---|---|---|---|
| 5,319,771 A | 6/1994 | Takeda | |
| 6,236,731 B1 * | 5/2001 | Brennan et al. | 381/316 |
| 6,408,269 B1 | 6/2002 | Wu et al. | |
| 6,453,285 B1 | 9/2002 | Anderson et al. | |
| 6,707,910 B1 | 3/2004 | Valve et al. | |
| 6,820,053 B1 | 11/2004 | Ruwisch | |
| 7,016,507 B1 | 3/2006 | Brennan | |
| 7,165,026 B2 | 1/2007 | Acero et al. | |
| 7,277,550 B1 | 10/2007 | Avendano et al. | |
| 7,383,179 B2 | 6/2008 | Alves et al. | |
| 7,453,963 B2 | 11/2008 | Joublin et al. | |
| 7,596,496 B2 | 9/2009 | Jabloun | |
| 7,953,596 B2 * | 5/2011 | Pinto | G10L 21/0208 381/71.1 |
| 8,020,015 B2 | 9/2011 | Jorgenson et al. | |
| 8,131,543 B1 | 3/2012 | Weiss et al. | |
| 8,306,817 B2 | 11/2012 | Yu et al. | |
| 8,346,545 B2 | 1/2013 | Jung et al. | |
| 2002/0038211 A1 | 3/2002 | Rajan | |

(Continued)

OTHER PUBLICATIONS

M. Sanjeev Arulampalam et al. "A Tutorial on Particle Filters for Online Nonlinear/Non-Gaussian Bayesian Tracking." IEEE Transactions on Signal Processing, vol. 50 No. 2 (2002): pp. 174-188.

Jianping Deng, Martin Bouchard, and Tet Hin Yeap. "Feature Enhacnement for Noisy Speech Recognition With a Time-Variant Linear Predictive HMM Structure." IEEE Transactions on Audio, Speech, and Language Processing, vol. 16, No. 5, Jul. 2008, pp. 891-899.

Ning Ma, Martin Bouchard, and Rafik A. Goubran. "Speech Enhancement Using a Masking Threshold Constrained Kalman Filter and Its Heuristic Implementations." IEEE on Audio, Speech, and Language Processing, vol. 14, No. 1, Jan. 2006, pp. 19-32.

(Continued)

*Primary Examiner* — Thomas Lee
*Assistant Examiner* — Aurel Prifti
(74) *Attorney, Agent, or Firm* — Rennie William Dover

(57) ABSTRACT

In accordance with an embodiment, a system for processing an incoming signal for audio application includes a parameter extraction module coupled for receiving an incoming signal having a first frequency that is configured to extract at least one parameter from the incoming signal. The system includes at least one oscillator and at least one processing engine processing that receives a clock signal from the at least one oscillator. In accordance with another embodiment, a method is provided that performs a first processing with the clock signal and generates an oscillator control signal for adjusting the frequency of the clock from the oscillator adaptively depending on parameters of the incoming signal extracted or analyzed in the first processing.

20 Claims, 1 Drawing Sheet

(56) References Cited

U.S. PATENT DOCUMENTS

| | | |
|---|---|---|
| 2004/0190732 A1 | 9/2004 | Acero et al. |
| 2005/0251746 A1 | 11/2005 | Basson et al. |
| 2005/0276363 A1 | 12/2005 | Joublin et al. |
| 2005/0288923 A1 | 12/2005 | Kok |
| 2006/0253283 A1 | 11/2006 | Jabloun |
| 2007/0010291 A1* | 1/2007 | Deng ............... G10L 21/0208 455/563 |
| 2007/0055508 A1* | 3/2007 | Zhao ................ G10L 21/0216 704/226 |
| 2007/0070038 A1 | 3/2007 | Hoffberg et al. |
| 2007/0154031 A1 | 7/2007 | Avendano et al. |
| 2009/0012783 A1* | 1/2009 | Klein ............... G10L 21/0208 704/226 |
| 2009/0074311 A1 | 3/2009 | Lee |
| 2009/0304198 A1* | 12/2009 | Herre ................ G10L 19/008 381/66 |
| 2009/0327791 A1* | 12/2009 | Aerts ........................ 713/500 |
| 2012/0297232 A1* | 11/2012 | Bircher ..................... 713/500 |

OTHER PUBLICATIONS

Jaco Vermaak et al. "Particle Methods for Bayesian Modeling and Enhancemnt of Speech Signals." IEEE Transactions on Speech and Audio Processing, vol. 10, No. 3, Mar. 2002, pp. 173-185.

E. Cornu, et al., "ETSI AMR-2 VAD: Evaluation and Ultra Low Resource Implementation", International Conference on Acoustics Speech and Signal Processing (ICASSP' 03), Apr. 2003, pp. 1-4.

Rob Drullman et al., "Effect of reducing slow temporal modulations on speech reception", J. Acoust. Soc. Am., vol. 95 No. 5, Pt. 11, May 1994, pp. 2670-2680.

* cited by examiner

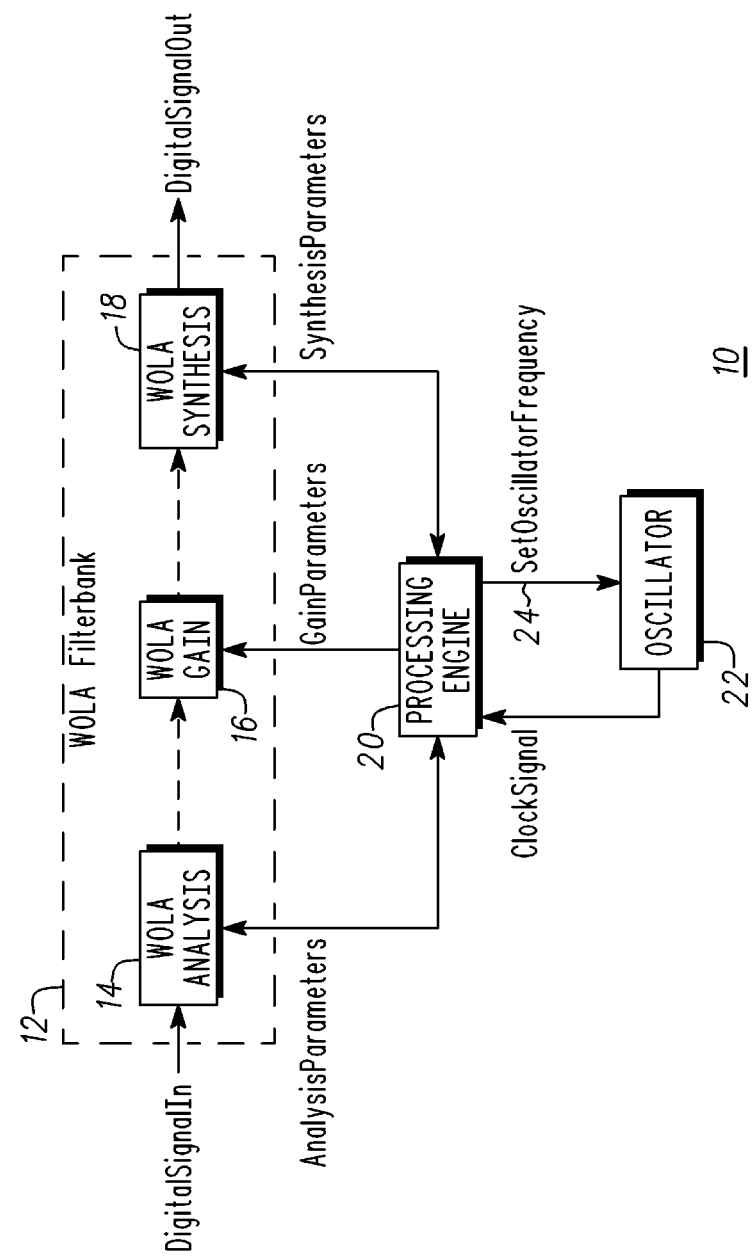

METHOD AND SYSTEM FOR PARAMETER BASED ADAPTATION OF CLOCK SPEEDS TO LISTENING DEVICES AND AUDIO APPLICATIONS

BACKGROUND

The present invention relates to audio signal processing, and more specifically to a method and system for adapting a clock frequency based on parameters of incoming signals for the audio applications.

Today's digital hearing aids are typically constrained in terms of how much current the audio processing engine(s) and transducers can consume due to small energy constrained batteries being used to power the hearing aids. It is the objective of the hearing aid designer to design the audio processing scheme embedded in the hearing aid in such a way that the overall current consumption is minimized. Lower current typically results in longer battery life, which is of benefit for the hearing aid end user. Longer battery life means that batteries will not have to be changed as often, which leads to cost savings and less inconvenience for the end-user.

Hearing aids typically have one or more programmable and/or configurable audio processing engines, in which the audio signal is processed digitally to provide signal enhancements for the hearing impaired user. These audio processing engines typically operate at a fixed clock frequency that is determined by the frequency of a main oscillator or a divided frequency of the main oscillator frequency. A fixed oscillator frequency being used for a processing engine implies that the engine will be running at a fixed frequency regardless of the amount of processing that the engine performs.

However, typically the amount of processing required depends on the nature of the parameters of the signal that the engine processes. In one scenario the nature of the parameters may require less cycles of processing within a set time period compared to what is made available by the main oscillator. Likewise, in another scenario the parameters of the signal may require more cycles of additional processing within a set time period compared to what is made available by the main oscillator.

In the first scenario the need for only a few cycles of processing compared to overall cycles available within a given time period implies that the frequency of clock cycles required is lower than the actual frequency of clock cycles provided by the main oscillator.

Similarly, in the second scenario the need for more clock cycles of processing compared to overall cycles available within a given time period implies that the frequency of clock cycles required is higher than the actual frequency of clock cycles provided by the main oscillator.

The fact that the clock frequency cannot be adjusted adaptively based on the nature of the signal parameters means that in the case where few cycles are required for processing compared to overall available cycles there will be unused cycles available for additional processing. Unused cycles implicitly mean that the clock frequency is too high for the actual processing required. In turn, too high a frequency implies that current from the battery is being consumed unnecessarily, which again leads to reduced battery life time.

Similarly, the fact that the clock frequency cannot be adjusted adaptively based on the nature of the signal parameters means that in the case where higher number of cycles are required compared to overall available cycles there will not be enough cycles available for additional processing. This implicitly means that the clock frequency is too low for the actual processing required.

There is a need for a system that allows for clock frequency adjustments in a digital hearing aid through adaptive change of the clock frequency to one or more processing engines.

SUMMARY

It is an object of the invention to provide a method and system that obviates or mitigates at least one of the disadvantages of existing systems.

According to an aspect of the present disclosure there is provided a system for processing an incoming signal for audio application, which includes: at least one oscillator; and at least one processing engine operating with a clock from the at least one oscillator, at least one processing engine performing at least one first processing and at least one second processing depending on the parameters, the at least one processing engine for adjusting the clock frequency of the clock, adaptively depending on parameters of the incoming signal extracted or analyzed in the first processing.

According to another aspect of the present disclosure there is provided a method of processing an incoming signal for audio application with a system having at least one oscillator and at least one processing engine, which includes: in the at least one processing engine having at least one first processing and at least one second processing performed depending on the parameters, performing the first processing with a clock from the oscillator; and generating an oscillator control signal for adjusting the frequency of the clock from the oscillator, adaptively depending on parameters of the incoming signal extracted or analyzed in the first processing.

According to another aspect of the present disclosure there is provided an embedded software program product usable with a programmable or configurable digital signal processor having readable program codes embodied therein for processing an incoming signal for audio application, which includes: at least one processing engine having at least one first processing and at least one second processing performed depending on the parameters; code for performing the first processing with a clock from the oscillator; and code for generating an oscillator control signal for adjusting the frequency of the clock from the oscillator, adaptively depending on parameters of the incoming signal extracted or analyzed in the first processing.

BRIEF DESCRIPTION OF THE DRAWING

These and other features of the invention will become more apparent from the following description in which reference is made to the appended drawings wherein:

The sole FIGURE is a block diagram illustrating an example of a listening system in accordance with an embodiment of the present disclosure.

DETAILED DESCRIPTION

It is an object of the invention to provide a method and system that obviates or mitigates at least one of the disadvantages of existing systems.

According to an aspect of the present disclosure there is provided a system for processing an incoming signal for audio application, which includes: at least one oscillator; and at least one processing engine operating with a clock from the at least one oscillator, at least one processing engine performing at least one first processing and at least one second processing depending on the parameters, the at least one processing engine for adjusting the clock frequency of the clock, adaptively depending on parameters of the incoming signal extracted or analyzed in the first processing.

According to another aspect of the present disclosure there is provided a method of processing an incoming signal for audio application with a system having at least one oscillator and at least one processing engine, which includes: in the at least one processing engine having at least one first processing and at least one second processing performed depending on the parameters, performing the first processing with a clock from the oscillator; and generating an oscillator control signal for adjusting the frequency of the clock from the oscillator, adaptively depending on parameters of the incoming signal extracted or analyzed in the first processing.

According to another aspect of the present disclosure there is provided an embedded software program product usable with a programmable or configurable digital signal processor having readable program codes embodied therein for processing an incoming signal for audio application, which includes: at least one processing engine having at least one first processing and at least one second processing performed depending on the parameters; code for performing the first processing with a clock from the oscillator; and code for generating an oscillator control signal for adjusting the frequency of the clock from the oscillator, adaptively depending on parameters of the incoming signal extracted or analyzed in the first processing.

One or more currently preferred embodiments have been described by way of example. It will be apparent to persons skilled in the art that a number of variations and modifications can be made without departing from the scope of the invention as defined in the claims.

Referring to FIG. 1, there is illustrated an example of a listening system 10. The listening system 10 of FIG. 1 includes a weighted overlap-add (WOLA) filterbank 12, a processing engine 20 and an oscillator 22 for providing a clock ClockSignal to the processing engine 20. The listening system 10 adjusts the frequency of the ClockSignal signal to process parameters extracted from an incoming signal. This solves the problem of differences in parameters supplied to or extracted in the processing engine 20, which require different amounts of processing, by using different clock speeds, thereby avoiding battery current being consumed unnecessarily. The adaptation of the clock frequency depends on signal parameters extracted or analyzed by the processing engine 20. Such adaptation will allow for a better match between the clock frequency and the amount of processing required, which in turn results in lower overall battery current consumption.

The listening system 10 is, for example, a hearing aid processing system for a hearing aid application or an audio system for audio applications in which incoming signals are processed. The incoming signals may include audio or sound signals possibly corrupted by noise. Hereinafter the system 10 is referred to as a hearing aid processing system 10.

The WOLA filterbank 12 receives an incoming signal DigitalSignalIn and provides an output signal DigitalSignalOut. The output signal DigitalSignalOut may be, for example, a signal having less noise than DigitalSignalIn or a signal with enhanced audio features compared to DigitalSignalIn. The DigitalSignalIn signal is typically provided by an A/D converter at a Frequency $F_{in}$. The signal DigitalSignalOut is typically provided to a D/A converter running at a Frequency $F_{out}$. Typically $F_{in}$ is equal to $F_{out}$ but this may not always be the case.

In this example, the WOLA filterbank 12 is used to extract parameters from the incoming signal DigitalSignalIn, as described in detail below. However, the hearing aid processing system 10 may include any other entity for extracting parameters from an incoming signal, other than the WOLA filterbank 12. Alternatives to the WOLA filterbank 12 may include, for example, a time domain filterbank or any other processing entity that is used to extract parameters from the incoming signal.

The processing engine 20 may be a programmable digital signal processor (DSP), a fixed function co-processor, a configurable processor or any combinations thereof. A direct connection between the processing engine 20 and the main oscillator 22 is formed by means of a signal (or a signal line) 24 that allows the processing engine 20 to directly control the main oscillator 22. In this example, the processing engine 20 outputs a signal SetOscillatorFrequency that connects the processing engine 20 to the main oscillator 22.

In FIG. 1, one processing engine 20 is shown as illustration purpose only. The hearing aid processing system 10 may include one or more than one processing engine 20, and each may adjust a clock frequency of the main oscillator 22 or a clock frequency of each main oscillator.

The WOLA filterbank 12 typically performs three steps of processing: WOLA Analysis 14, WOLA Gain 16 and WOLA Synthesis 18. Once WOLA Synthesis 18 has completed, the output signal DigitalSignalOut is available. The concept of the WOLA filterbank is described in detail in U.S. Pat. No. 6,236,731 B1, which is incorporated herein by reference.

In each of the three stages, parameters (e.g., AnalysisParameters, GainParameters and SynthesisParameters shown in FIG. 1) may be interchanged between the WOLA filterbank 12 and the processing engine 20. Analysis 14 parameters may be provided to the processing engine 20 for a first processing and a possible second processing performed after the first processing. Similarly, Synthesis 18 parameters may be provided to the processing engine 20 for a first processing and a possible second processing performed after the first processing.

Gain 16 parameters are typically provided by the processing engine 20 to the WOLA Gain 16 function as a result of the second processing of the Analysis 14 parameters and/or the second processing of the Synthesis 18 parameters.

Subsequent to the first processing for a set of parameters, the processing engine 20 may perform a second processing for the same set of parameters, or perform the first processing for a new set of the parameters, or perform another processing for a set of different parameters. Here the amount of processing in a processing may be different from that of a next processing. In one example, once a first (and/or second) processing is completed, the processing engine 20 outputs the control signal SetOscillatorFrequency to adaptively adjust the clock frequency of the clock ClockSignal such that the clock frequency is suitable for a next processing in the processing engine 20. The processing engine 20 will perform the next processing with the clock ClockSignal with the adjusted frequency. The SetOscillatorFrequency signal ensures that the exact number of cycles required to process the signal in the second processing in the processing engine 20 within a given time period is available.

In the first processing the parameters provided to the processing engine 20 will be assessed through means of digital signal processing. In the case of the WOLA Analysis 14 parameters, this processing may imply having an algorithm determine if the signal from which the WOLA Analysis 14 parameters originate represent a quiet, external environment or if the parameters represent an external environment in which there a speech signal is present.

If the algorithm classifies the signal as originating in a quiet, external environment no second processing may be performed in the processing engine 20. In this case the processing engine 20 provides the signal SetOscillatorFrequency to the main oscillator 22 such that the clock frequency is to be of frequency $F_1$. This implies that if the clock frequency by the main oscillator 22 is already at $F_1$ the main oscillator 22 will not change its output frequency. If the clock frequency is at a frequency $F_2$ that is higher than $F_1$, this implies that the signal SetOscillatorFrequency will result in the main oscillator 22 output frequency to be lowered to $F_1$.

If the algorithm classifies the signal as originating from an environment in which speech is present a second processing may be performed. To have sufficient clock cycles available to do the second processing the processing engine 20 first provides the signal SetOscillatorFrequency to the main oscillator 22 that the frequency be set at $F_2$. This implies that if the clock frequency is at $F_2$ the oscillator 22 will not change its output frequency. If the clock frequency is at a frequency $F_1$ that is lower than $F_2$ this implies that the signal SetOscillatorFrequency will result in the oscillator 22 output frequency to be increased to $F_2$. Once the main oscillator 22 frequency has been changed to $F_2$ the processing engine 20 will complete the second processing for the WOLA Analysis 14 parameters. Once this second processing is completed new WOLA Analysis 14 parameters are provided to the processing engine 20 and the first and (potentially) the second processing are repeated.

It would be well understood by one of ordinary skill in that art that other types of first and second processing may exist.

As a second type of first processing, within the WOLA filterbank 12 example a first processing may include analyzing the WOLA Synthesis 18 parameters or a combination of the WOLA Analysis 14 and WOLA Synthesis 18 parameters. Generally, such combined analysis in a first processing has the purpose of bringing the parameters into a pattern matching space where signal energies can be matched with references energies to classify the incoming signal, for example, as speech, music, quiet, etc.

As a first type of second processing, within the WOLA filterbank 12 example a second processing may include applying speech enhancement techniques in case the first processing classifies the parameters obtained as speech.

Further, other first processing and second processing exist where the parameter inputs to the processing engine 20 do not come from the WOLA filterbank 12 but rather from another processing engine used to extract features from a signal.

Further, the first processing is not confined to determining if a signal originates in a quiet or speech environment. Other first processings exist where features are extracted from a signal and where clock frequency adjustments may be performed. Such processings may include analyzing a signal from a wireless receiver and determine in a first processing if error correction is to be performed.

Further, the second processing is not confined to processing parameters only if these originate from a speech environment. Other second processing exists where additional processing may be performed on extracted features processed in a first processing and where clock frequency adjustments may be performed. Such processings may include performing error correction on an incoming signal if a first processing determines that the error correction is to be performed.

According to the embodiments of the present disclosure, a clock frequency of a clock for a processing engine is adapted depending on signal parameters extracted or analyzed in the processing engine, thereby adjusting the frequency of the clock that is used in a next processing and thus reducing battery current consumption.

Another alternative option for reducing battery current consumption is to have an integer divider between an oscillator clock output and a processing engine clock input. This allows for integer division of the clock frequency driving the processing engine. This option works well as long as the parameters extracted by the processing engine requires a signal processing amount corresponding to either the full amount of cycles or the amount of cycles obtained through integer division. If the amount of cycles required is in between the two, the integer clock division scheme will not provide an optimal solution. Optimal in this context implies that the amount of cycles within one time period is exactly matched to the amount of operations (processing) required within said period. In this case the parameters extracted would necessitate the need for operating the processing engine at the highest clock frequency—integer division would not result in enough cycles for processing the signal.

By contrast, according to the embodiment of the present disclosure, the parameters extracted or processed by the processing engine 20 does not require a signal processing amount corresponding to either the full amount of cycles or the division of the cycle.

A further alternative option would be to simply clock the engine on the highest clock frequency and power off (or put to sleep) a processing engine once the processing dictated by the extracted parameters have been performed. Sleep implies that a clock is still applied to the engine but no processing takes place. However, this scheme would still result in the oscillator running at a higher frequency than necessary, which leads to unnecessary battery current consumed.

By contrast, according to the embodiment of the present disclosure, the oscillator runs at a higher frequency only when it is required.

The embodiments described herein may include one or more elements or components, not illustrated in the drawings. The embodiments may be described with the limited number of elements in a certain topology by way of example only. Each element may include a structure to perform certain operations. Each element may be implemented as hardware, software, or any combination thereof. Software codes, either in its entirety or a part thereof, may be stored in a computer readable medium. Further, a computer data signal representing the software code which may be embedded in a carrier wave may be transmitted via a communication network.

What is claimed is:

1. A system for processing an incoming signal for audio application, comprising:

a parameter extraction module having an input terminal, an output terminal, a first input/output terminal, a second input/output terminal, and a third input/output terminal, the input terminal coupled for receiving the incoming signal wherein the incoming signal has a first frequency, the output terminal transmits an output signal having a second frequency, and wherein the parameter extraction module is configured to extract least one parameter from the incoming signal, the at least one parameter including a component that indicates the presence of a speech signal in the incoming signal;

at least one processing engine having an input terminal, an output terminal, a first input/output terminal, a second input/output terminal, and a third input/output terminal, the first input/output terminal of the at least one processing engine coupled to the first input/output terminal of the parameter extraction module, the second input/output terminal of the at least one processing engine coupled to the second input/output terminal of the parameter extraction module, the third input/output terminal of the at least one processing engine coupled to the third input/output terminal of the parameter extraction module, wherein the input terminal of the at least one processing engine is coupled for receiving a clock signal having a clock frequency, the at least one processing engine performing at least one first processing and subsequently performing at least one second processing depending on whether the component of the at least one parameter indicates the presence of speech, and wherein the at least one processing engine is configured for adjusting a clock frequency of the clock signal adaptively depending on parameters of the incoming signal extracted or analyzed in the first processing; and at least one oscillator having an input terminal and an output terminal, the input terminal of the at least one oscillator directly connected to the output terminal of the at least one processing engine and the output terminal of the at least one oscillator directly connected to the input terminal of the processing engine for transmitting the clock signal to the at least one processing engine.

2. A system according to claim 1, wherein the at least one processing engine is for adjusting the clock frequency such that a number of cycles required to process the signal in the second processing in the processing engine within a given time period is available.

3. A system according to claim 1, wherein the at least one processing parameter is exchanged between the at least one processing engine and the parameter extraction module.

4. A system according to claim 3, wherein the parameter extraction module comprises a weighted overlap add (WOLA) filterbank.

5. A system according to claim 4, wherein the at least one parameter comprises:
WOLA analysis parameters, WOLA gain parameters, WOLA synthesis parameters or combinations thereof.

6. A system according to claim 1, wherein a signal for adjusting the clock frequency is directly connected from the at least one processing engine to the at least one oscillator through the output of the at least one processing engine and the input of the at least one oscillator.

7. A system according to claim 1, wherein an amount of processing in the first processing is different from an amount of processing in the second processing.

8. A system according to claim 1, wherein the system is employed for a hearing aid application.

9. A system according to claim 1, wherein the at least one processing engine provides a control signal to the at least one oscillator to set the frequency of the oscillator is at a first frequency, wherein the oscillator continues generating a signal at an initial frequency in response to the initial frequency being equal to the first frequency and wherein the control signal lowers the initial frequency of the oscillator to the first frequency in response to initial frequency being greater than the first frequency.

10. A system according to claim 1, wherein the at least one processing engine performs the second processing in response to the incoming signal being identified as original from an environment in which speech is present.

11. A system according to claim 10, wherein the at least one processing engine provides another control signal to the at least one oscillator to perform another processing that sets the frequency of the oscillator is at a second frequency, wherein the oscillator continues generating a signal at another initial frequency in response to the another initial frequency being equal to the second frequency and wherein the control signal increases the another initial frequency of the oscillator to the second frequency in response to the another initial frequency being less than the second frequency.

12. A system according to claim 10, wherein providing another control signal to the at least one oscillator to perform another processing includes applying speech enhancement techniques in response to the at least one first processing classifies parameters obtained as speech.

13. A method of processing an incoming signal for audio application with a system having a parameter extraction module having an input terminal, an output terminal, a first input/output terminal, a second input/output terminal, and a third input/output terminal, the input terminal coupled for receiving the incoming signal wherein the incoming signal has a first frequency, the output terminal transmits an output signal having a second frequency, and wherein the parameter extraction module is configured to extract least one parameter from the incoming signal, at least one oscillator and at least one processing engine, the at least one processing engine having an input terminal, an output terminal, a first input/output terminal, a second input/output terminal, and a third input/output terminal, the first input/output terminal of the at least one processing engine coupled to the first input/output terminal of the parameter extraction module, the second input/output terminal of the at least one processing engine coupled to the second input/output terminal of the parameter extraction module, the third input/output terminal of the at least one processing engine coupled to the third input/output terminal of the parameter extraction module, wherein the input terminal of the at least one processing engine is coupled for receiving a clock signal having a clock frequency, the method comprising:

in the at least one processing engine having at least one first processing and subsequently having at least one second processing performed depending on at least one processing parameter, performing the first processing with a clock signal from the at least one oscillator, wherein the first processing includes bringing the at least one extracted parameter into a pattern matching space where signal energies can be matched with reference energies to classify the incoming signal for a type of content in the incoming signal;

generating an oscillator control signal for adjusting the frequency of the clock from the oscillator, adaptively, depending on parameters of the incoming signal extracted or analyzed in the first processing; and performing a second processing in response to the type of content in the incoming signal including speech.

14. A method according to claim 13, comprising:
performing the first processing or the second processing with the clock signal from the oscillator.

15. A method according to claim 13, comprising:
in the at least one oscillator, providing the clock signal such that a number of cycles required to process the signal in the second processing in the processing engine within a given time period is available.

16. A method according to claim 13, comprising: interchanging the parameters between the parameter extraction module and the at least one processing engine.

17. A method according to claim 16, wherein the interchanging comprises:
interchanging weighted overlap add (WOLA) analysis parameters, WOLA gain parameters, WOLA synthesis parameters or combinations thereof, between the WOLA filterbank and the processing engine.

18. A method according to claim 16, wherein the parameter extraction module is a WOLA filterbank.

19. A method according to claim 16, wherein the parameter extraction module is a time domain filterbank.

20. A computer program product, comprising:
a non-transitory computer readable storage device having and a computer readable program code embodied therewith where the computer readable program code when executed on a computer causes the computer to:
code for performing the first processing with a clock from an oscillator;
code for generating an oscillator control signal for adjusting the frequency of the clock signal from the oscillator adaptively depending on parameters of the incoming signal extracted or analyzed in the first processing;
wherein the computer readable program code is configured to interact with a system having a parameter extraction module having an input terminal, an output terminal, a first input/output terminal, a second input/output terminal, and a third input/output terminal, the input terminal coupled for receiving the incoming signal wherein the incoming signal has a first frequency, the output terminal transmits an output signal having a second frequency, and wherein the parameter extraction module is configured to extract least one parameter from the incoming signal, the at least one parameter including a component that indicates the presence of a speech signal in the incoming signal;
at least one processing engine having an input terminal, an output terminal, a first input/output terminal, a second input/output terminal, and a third input/output terminal, the first input/output terminal of the at least one processing engine coupled to the first input/output terminal of the parameter extraction module, the second input/output terminal of the at least one processing engine coupled to the second input/output terminal of the parameter extraction module, the third input/output terminal of the at least one processing engine coupled to the third input/output terminal of the parameter extraction module, wherein the input terminal of the at least one processing engine is coupled for receiving a clock signal having a clock frequency, the at least one processing engine performing at least one first processing and subsequently performing at least one second processing depending on whether the component of the at least one parameter indicates the presence of speech, and wherein the at least one processing engine is configured for adjusting a clock frequency of the clock signal adaptively depending on parameters of the incoming signal extracted or analyzed in the first processing; and
at least one oscillator having an input terminal and an output terminal, the input terminal of the at least one oscillator directly connected to the output terminal of the at least one processing engine and the output terminal of the at least one oscillator directly connected to the input terminal of the processing engine for transmitting the clock signal to the at least one processing engine.

* * * * *